(12) United States Patent
Conorich et al.

(10) Patent No.: US 6,368,163 B1
(45) Date of Patent: Apr. 9, 2002

(54) SNAP-ON CONTACT RETENTION COMB FOR A 110 TYPE CONNECTING BLOCK

(75) Inventors: Theodore A. Conorich, Parsippany Township, Morris County; William J. Ivan, Woodbridge, both of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/574,512

(22) Filed: May 19, 2000

(51) Int. Cl.[7] ............................................. H01R 13/514
(52) U.S. Cl. ........................................ 439/752; 439/403
(58) Field of Search ................................ 439/403, 404, 439/248, 752

(56) References Cited

U.S. PATENT DOCUMENTS

| 3,798,587 A | | 3/1974 | Ellis, Jr. et al. ............ 439/403 |
| 4,295,703 A | | 10/1981 | Osborne et al. ............. 434/403 |
| 5,591,045 A | * | 1/1997 | Pepe et al. .................. 439/460 |
| 5,947,774 A | * | 9/1999 | Abe ............................ 439/701 |
| 6,129,574 A | * | 10/2000 | Okayasu et al. ............. 439/404 |
| 6,200,172 B1 | * | 3/2001 | Konoya et al. ............. 439/752 |
| 6,200,903 B1 | * | 4/2001 | Huang ........................ 439/894 |
| 6,210,204 B1 | * | 4/2001 | Ko et al. .................... 439/404 |
| 6,234,848 B1 | * | 5/2001 | Sikora et al. ............... 439/752 |

* cited by examiner

Primary Examiner—Brian Sircus
Assistant Examiner—Michael C. Zarroli
(74) Attorney, Agent, or Firm—Gibbons, Del Deo Dolan, Griffinger & Vecchione

(57) ABSTRACT

A connector block assembly comprises a connector block body, a conductor element, and an alignment comb, which attaches to the connector block body via a snap-lock assembly. The snap-lock assembly simultaneously locks the three elements, the connector block body, the conductor element, and the alignment comb, securely together at the time of assembly.

15 Claims, 5 Drawing Sheets

SNAP-ON CONTACT RETENTION COMB FOR A 110 TYPE CONNECTING BLOCK

FIELD OF THE INVENTION

This invention relates generally to the field of telecommunications, and more particularly to connectors.

BACKGROUND OF THE INVENTION

The telecommunications and data management industries utilize connective hardware for general building wiring, premises distribution systems, local area networks, and other network applications. The connective hardware known as the 110 Connector Systems has become a standard of the industry because of the reliable gas-tight connection provided by the 110 Insulation Displacement Connector. This miniature quick-connect terminating system is listed or approved by Underwriters Laboratories, the Canadian Standards Association, and the Australian Standards Association. The 110 Connector Systems have gained type approval from such countries as the United Kingdom, Japan, Korea, and others.

The 110 Connector System consists of field-wired cable termination apparatus that is used to organize and administer cable and wiring installations. The main cross-connect is typically located in the equipment room and provides termination and cross-connection of network interface equipment, switching equipment, processor equipment, and backbone (riser or campus) wiring. The horizontal cross-connect is typically located in the telecommunications closet and provides termination and cross-connection of horizontal (to the work area) and backbone wiring. Cross-connects provide efficient and convenient routing and rerouting of common equipment circuits to various parts of a building or campus. Such 110 Connector Systems include connector blocks.

Connector blocks make electrical connections and simultaneous interconnections between a multiplicity of conductors in telephone lines of a communication system. Connector blocks have been previously disclosed, such as in U.S. Pat. No. 3,798,587 to B. C. Ellis Jr. et al, where two piece construction is used to create a connector block assembly, and in U.S. Pat. No. 4,295,703, where a connector block constructed of thermoplastic material is disclosed. The method of creating this connector block involves first assembling the elements, and then an additional separate step of permanently affixing such as by bonding, joining, securing, attaching, coupling, or fastening the thermoplastic elements of the connector block is required. This additional step of having permanently affixing such as by bonding, joining, securing, attaching, coupling, or fastening after the connector block has been assembled is a time consuming in the production of the connector block assembly. Not only does this step delay the overall period of production, but it also creates the possibility for increased inaccuracy and error. Such a delay in production results in higher costs and decreased output.

SUMMARY

In accordance with the present invention, there is provided a connector block assembly. The connector block assembly comprises a connector block body, a conductor element, and an alignment comb. The alignment comb attaches to the connector block body with a snap-lock assembly, wherein the snap-lock assembly securely simultaneously locks the three elements together at the time of assembly.

BRIEF DESCRIPTION OF THE DRAWING

A more complete understanding of the present invention may be obtained from consideration of the following description in conjunction with the drawing, in which.

DESCRIPTION OF THE PREFERRED EMBODIMENTS

Figure 1:
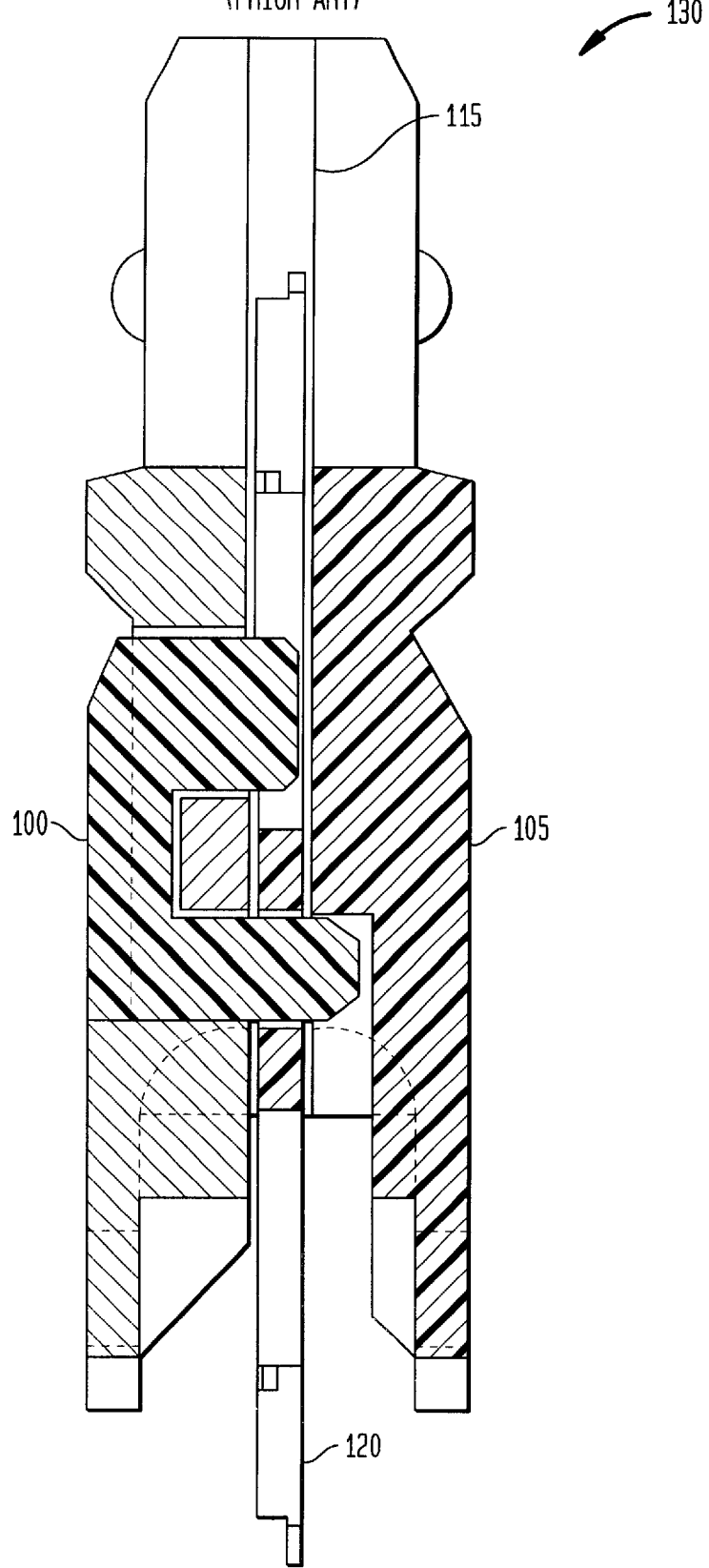
FIG. 1 is a cross-section view of an existing 110 Type connecting block.
Figure 2:
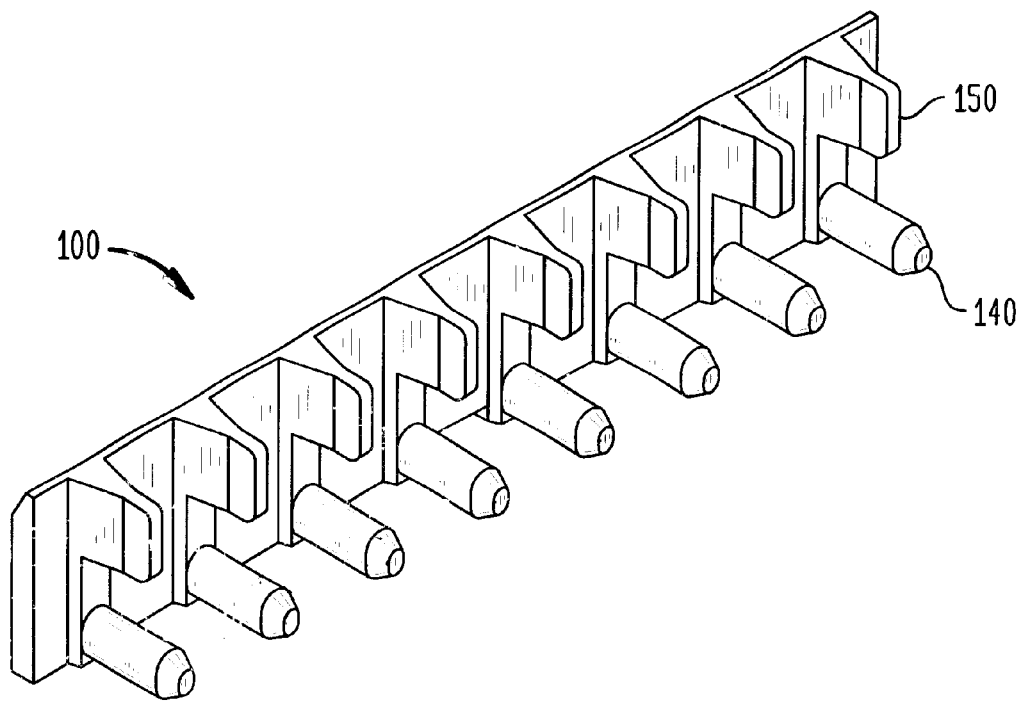
FIG. 2 is a perspective view of a comb that would be attached by ultrasonic welding showing the alignment fingers and retention teeth.

Referring now to the drawings, and especially to FIGS. 1 and 2, there is shown an existing 110 type connecting block having an ultrasonically welded comb with alignment fingers and retention teeth. The existing 110 type connecting block 130, consists of a connecting block body 105, with a conductor element 120 located in the middle of the connecting block 130. The conductor element 120 is then held in place by alignment fingers 140 of an alignment comb 100. The alignment comb 100 is equipped with an alignment finger 140, which holds the conductor element 120 in place and resists the forces associated with terminating a wire to the connecting block 130. Retention teeth 150 align the conductor element 120 within the slot 115 of the connector block body 105. After the connecting block body 105, conductor element 120 and the alignment comb 100 are assembled together, an additional step is required to bond the components together. Standard methods for bonding the three components consist of ultrasonic welding, as well as the use of various types of adhesives, and chemical bonding.

Figure 3:
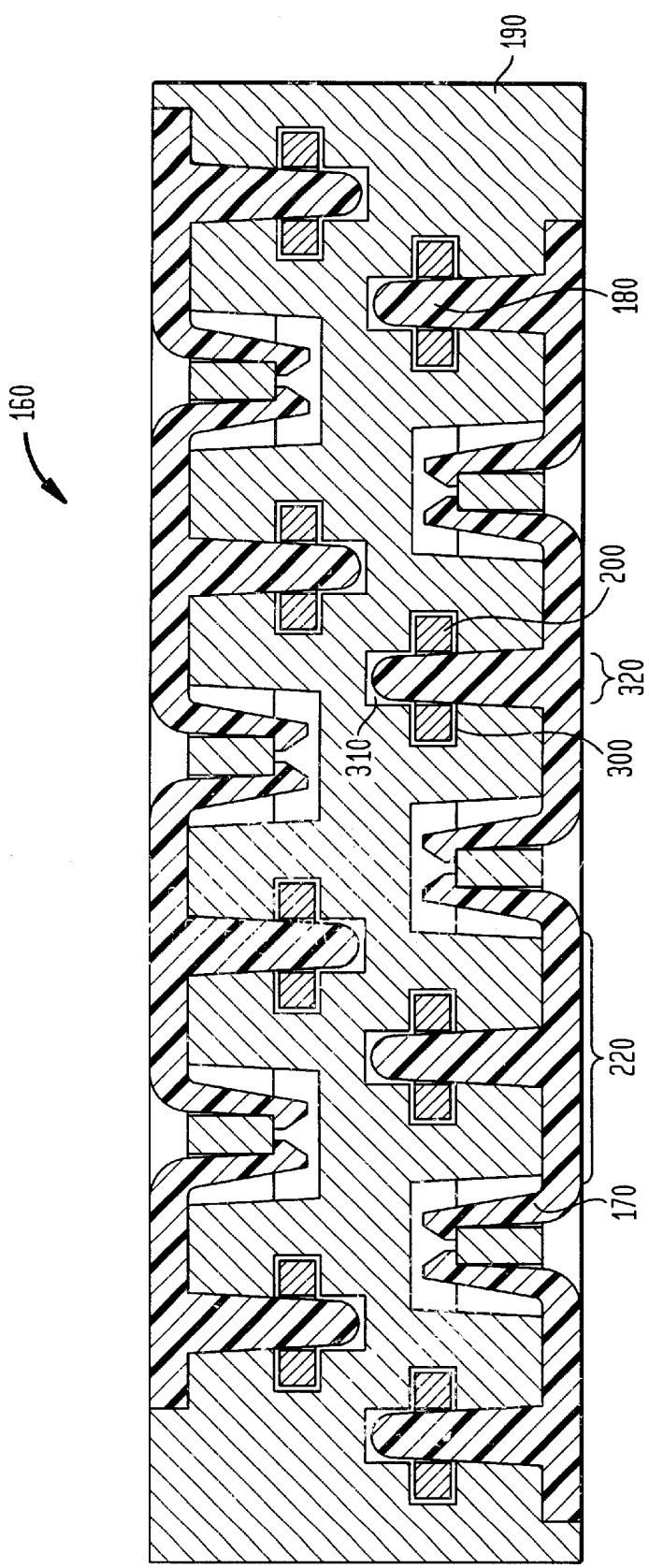
FIG. 3 is a cross-section view of the assembled connector block body and the alignment comb with the snap-lock.
Figure 4:
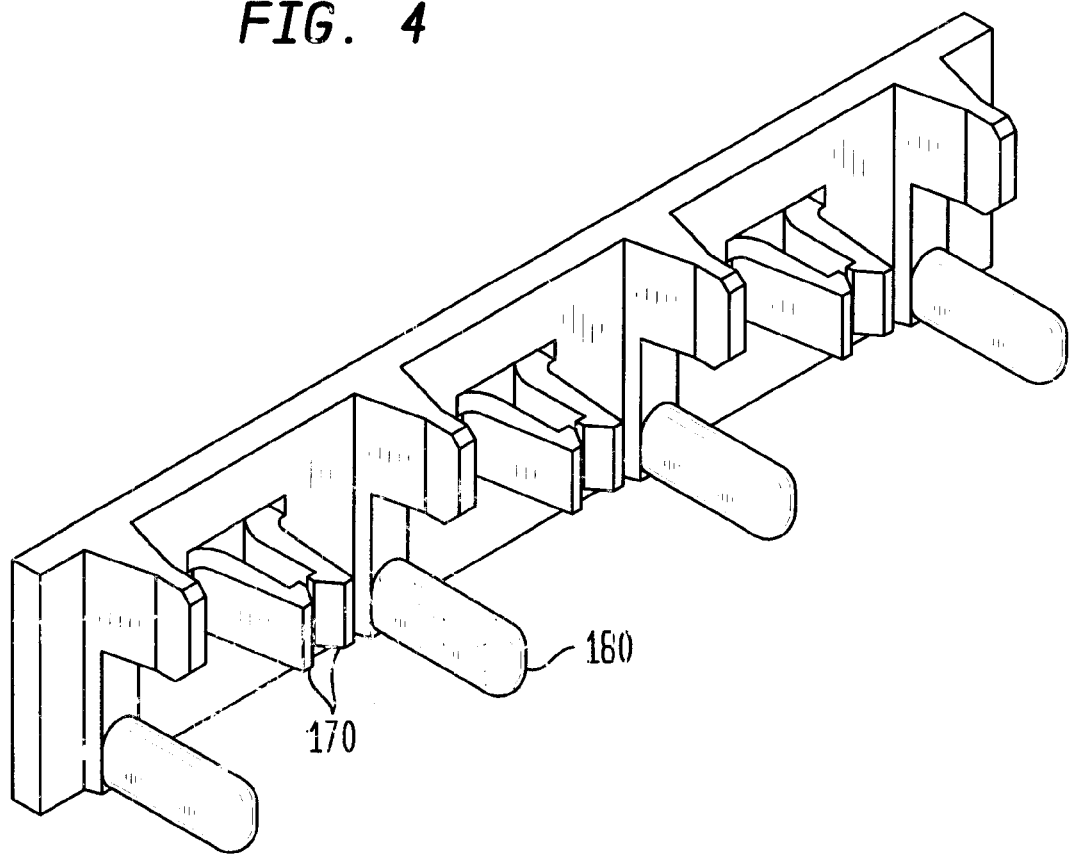
FIG. 4 is a perspective view of a snap-lock alignment comb with opposing latching fingers.

Referring now to FIG. 3, there is shown a cross-section view of the assembled connector block body and the alignment comb with the snap-lock. Additionally referring to FIG. 4, there is shown a perspective view of a snap-lock alignment comb with opposing latching fingers. In one embodiment of the present invention, a connecting block body assembly 160 consists of the connector block body 190 with an aligned conductor element 200. The conductor element 200 lies in an internal passage 300 in the connector body 190. This conductor element 200 is then held in place by the alignment finger 180, of the alignment comb 220, which runs through an alignment aperture 320 in the conductor element 200 and then rests in the alignment passage 310 of the connector block body 190. In a preferred embodiment, the aligmnent passage 310 of the connector block body 190 is perpendicular to the internal passage 300. The latching finger 170 of the alignment comb 220 connects the alignment comb 220 to the connector block body 190. The latching finger 170 snap-locks onto the connector block body 190 simultaneously when the three elements are attached, thus no additional form of bonding is required.

Figure 5:
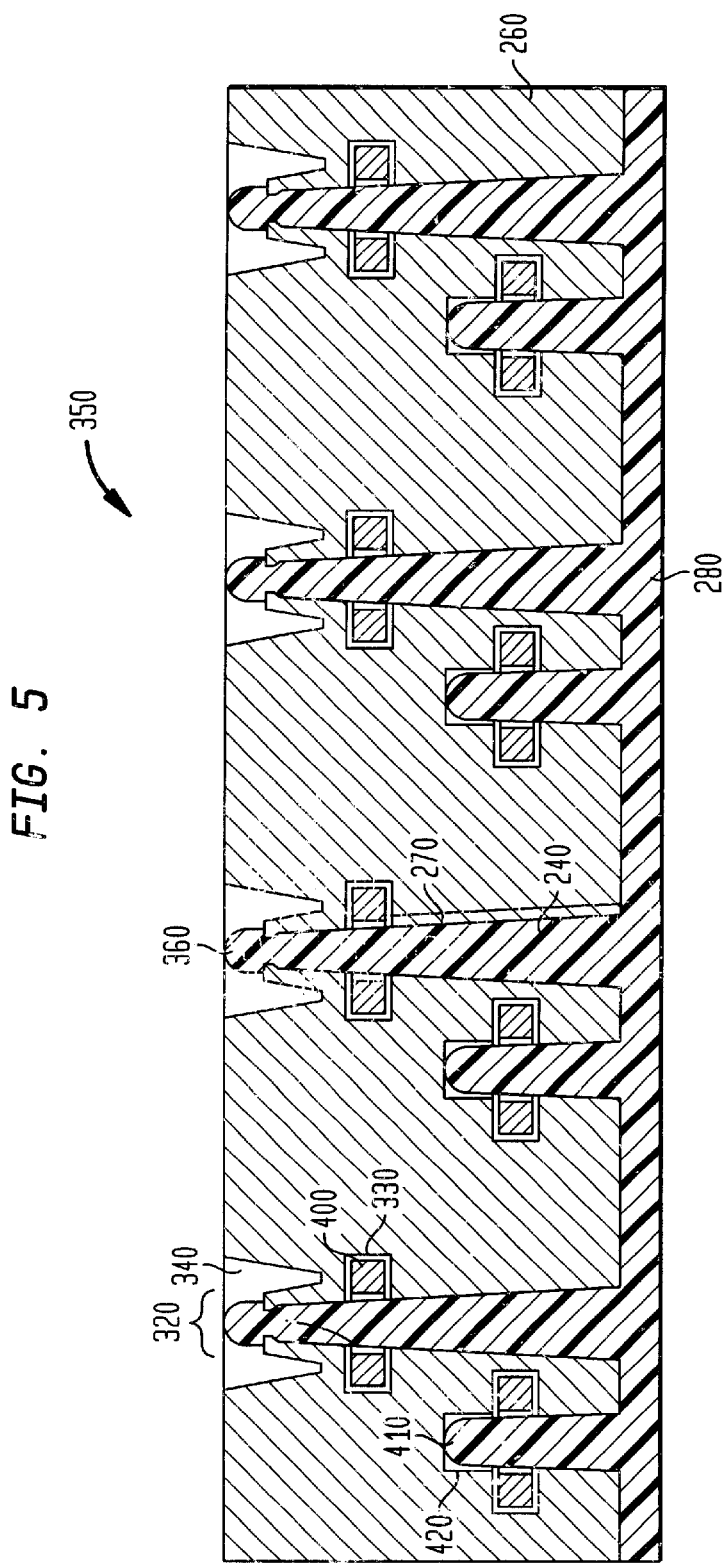
FIG. 5 is a cross-section view of the assembled connector block body with an alignment comb equipped with an alignment finger, conductor element retention, and snap-lock.

Referring to FIG. 5, there is shown a cross-section view of the assembled connector block body with an alignment comb equipped with an alignment finger, conductor element retention and snap-lock. In yet another representative embodiment of the invention, the alignment finger 240 of the alignment comb 280 lies in the alignment passage 270 of the connector block body 260. This alignment finger 240 runs through the aperture 320 of the conductor element 400, which is positioned in the internal passage 330 of the connector block body 260. This alignment finger 240 in turn maintains the proper placement of the conductor element 400. The raised portion 360 of the alignment finger 240 is placed in the open recess 340 of the connector block body 260 where the snap-lock assembly occurs. No additional step for bonding is required, because the three elements are simultaneously attached when they are being assembled.

Another representative embodiment of the invention is shown in FIG. 5, which includes the assembled connector block body with an alignment comb equipped with an alignment finger, conductor element retention, snap-lock, and an additional raised portion (also known as an alignment finger) on the alignment comb. The alignment finger 240 of the alignment comb 280 lies in the alignment passage 270 of the connector block body 260. This alignment finger 240 runs through the aperture 320 of the conductor element 400, which is positioned in the internal passage 330 of the connector block body 260. This alignment finger 240 in turn maintains the proper placement of the conductor element 400. The tip 360 of the alignment finger 240 is placed in the open recess 340 of the connector block body 260 where the snap-lock assembly occurs. In addition, on the alignment comb is a raised portion 410 that rests in a corresponding open recess 420 on the connector block body 260. No additional step for bonding is required, because the three elements are simultaneously attached when they are being assembled.

Another representative embodiment of the invention (not shown) includes the assembled connector block body with an alignment comb equipped with an alignment finger, conductor element retention, snap-lock, an additional raised portion on the connector block body and a recess on the alignment comb. The alignment finger of the alignment comb lies in the alignment passage of the connector block body. This alignment finger runs through the aperture of the conductor element, which is positioned in the internal passage of the connector block body. This alignment finger in turn maintains the proper placement of the conductor element. The tip of the alignment finger is placed in the open recess of the connector block body where the snap-lock assembly occurs. In addition, on the connector bock body is a raised portion that snap locks into a corresponding open recess on the alignment comb. No additional step for bonding is required, because the three elements are simultaneously attached when they are being assembled.

Numerous modifications and alternative embodiments of the invention will be apparent to those skilled in the art in view of the foregoing description. In particular, the number of alignment combs having snap locks and their positions may be varied. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which will come within the scope of the appended claims, is reserved.

What is claimed:

1. A connector block assembly comprising:
    connector block body having at least one internal passage and alignment passage;
    conductor element adapted for insertion into each of said at least one internal passage;
    alignment comb having an alignment finger adapted for insertion into said alignment passage and to pass through said alignment aperture to retain the conductor element in a fixed position with respect to the connector block body;
    wherein said alignment comb is attached to said connector block body by a snap-lock.

2. The connector block assembly as recited in claim 1 wherein said alignment passage of said connector block body is substantially perpendicular to said internal passage.

3. The connector block assembly as recited in claim 1 wherein said snap-lock assembly comprises at least one recess on said connector block body and a corresponding raised portion on said alignment comb adapted so that engaging said corresponding raised portion with said at least one recess rests in said alignment comb to said connector body.

4. The connector block assembly as recited in claim 1 wherein said snap-lock assembly comprises at least one recess on said alignment comb and a corresponding raised portion on said connector body adapted so that engaging said corresponding raised portion with said at least one recess locks said alignment comb to said connector body.

5. The connector block assembly as recited in claim 3 wherein said corresponding raised portion is integral to said alignment finger.

6. The connector block assembly as recited in claim 3 wherein said corresponding raised portion is on a latching finger.

7. The connector block assembly as recited in claim 1 wherein said snap-lock assembly requires greater force to unlock than to lock.

8. The connector block assembly as recited in claim 6 wherein the alignment finger is positioned on the edge of said alignment comb.

9. The connector block assembly as recited in claim 6 wherein the latching finger is positioned on the edge of said alignment comb.

10. A method of simultaneous assembly and attachment of a connector block assembly comprising the steps of:
    inserting a conductor element having an alignment aperture into an internal passage of a connector block body;
    retaining the conductor element in a fixed position with respect to the connector block by inserting an alignment finger of an alignment comb into an alignment passage of the connector block and passing the alignment finger through said alignment aperture; and
    attaching said alignment comb to said connector block body with a snap-fit.

11. The method of simultaneous assembly and attachment of a connector block assembly of claim 10 including inserting a raised portion on an alignment comb into an open recess on said connector block body wherein said raised portion of said alignment comb snaps into said recess of said connector block body via a snap-lock assembly.

12. The method of simultaneous assembly and attachment of a connector block assembly of claim 10 including inserting a raised portion on said connector block assembly into an open recess on an alignment comb wherein said raised portion of said connector block body snaps into said recess of said alignment comb via a snap-lock assembly.

13. The method of simultaneous assembly and attachment of a connector block assembly of claim 10 including inserting a raised portion on an alignment comb integral to an alignment finger on said alignment comb into an open recess on said connector block body wherein said raised portion of said connector block body snaps into said recess of said alignment comb via a snap-lock assembly.

14. The method of simultaneous assembly and attachment of a connector block assembly of claim 10 including inserting a latching finger on an alignment comb into an open recess on said connector block body wherein said latching finger of said alignment comb snaps into said recess of said connector block body via a snap-lock assembly.

15. The method of claim 10 wherein the step of locking further comprises requiring greater force to unlock than lock.

* * * * *